United States Patent

[11] 3,587,523

[72] Inventors Sidney Tudor
Williston Park;
Jack Mironov, Mount Vernon, N.Y.
[21] Appl. No. 801,523
[22] Filed Feb. 24, 1969
[45] Patented June 28, 1971
[73] Assignee the United States of America, as represented by the Secretary of Navy

[54] VACUUM COATING APPARATUS
5 Claims, 3 Drawing Figs.
[52] U.S. Cl. .................................................. 118/50.1,
117/17, 117/21, 117/93.2, 118/620, 118/627, 118/641
[51] Int. Cl. ...................................................... C23b 11/00
[50] Field of Search ............................................ 118/627, 641, 620, 50.1; 117/17, 21, 93, 93.2

[56] References Cited
UNITED STATES PATENTS

| | | | |
|---|---|---|---|
| 537,011 | 4/1895 | Burton et al. ................. | 118/620X |
| 2,173,032 | 9/1939 | Wintermute ................. | (118/612UX) |
| 3,108,022 | 10/1963 | Church .......................... | 118/620X |
| 3,167,442 | 1/1965 | Brooks .......................... | 118/620X |
| 3,282,249 | 11/1966 | Ramsay ......................... | 118/620 |
| 3,408,432 | 10/1968 | Tumm et al. .................. | 118/620X |

*Primary Examiner*—Mervin Stein
*Attorneys*—Louis A. Miller, Louis B. Applebaum and Ernest F. Weinberger

ABSTRACT: A sealed chamber having means for evacuating the same and including means for suspending therein workpiece to be coated and providing for the heating of said workpiece. A lower portion of said chamber contains the material for coating in powder form. The coating powder is agitated and brought into direct contact with the workpiece while it is heated and the chamber is under vacuum.

INVENTORS.
SIDNEY TUDOR
JACK MIRONOV

VACUUM COATING APPARATUS

The invention described herein may be manufactured and used by or for the Government of the United States of America for governmental purposes without the payment of any royalties thereon or therefor.

BACKGROUND OF THE INVENTION

1. Field of the Invention

The present invention relates to coating methods and apparatus and more particularly pertains to improvements in fluidized bed coatings as applied to resins and polymers.

2. Description of the Prior Art

In the field of polymer coatings, it has been the general practice to employ fluidized bed processes to coat various high temperature materials. This process consists in providing a fluidized bed which by definition is a mass of solid particles which exhibits the liquid like characteristics of mobility, hydrostatic pressure, and an observable upper free surface across which a marked change in concentration of particles occurs. Localized auxiliary motion can be imparted to the particles by a stream of air or gas entering at the bottom and passing upwardly through the bed. The part to be coated is preheated above the melting point of the polymeric resin coating powder and then dipped into the fluidized bed. The powder striking the hot surface melts and adheres to the surface of the part.

These methods and apparatus have been unsatisfactory in certain regards: oxidation of the surface of the part to be coated takes place generally during the preheating. Atmospheric and generated gases are entrapped at the interface between the surface of the part and the polymer coating, thus substantially reducing the adhesion therebetween and the coating integrity. This is especially evident in the case of fluorinated polyethylenes in addition to the problem of elevated preheat temperatures. Coatings for these materials, where possible, are nonuniform, extremely thin, porous, and exhibit poor coating adhesion.

SUMMARY OF THE INVENTION

The general purpose of this invention is to provide a polymer coating apparatus and technique that has all the advantages of similarly employed prior art devices and has none of the above described disadvantages. To attain this, the present invention provides an evacuated sealed chamber into which are placed a fluidized polymeric powder, and the suspended member to be coated therewith. The member is heated and the bed is placed in motion or physically agitated so as to cause the particles thereof to come into direct contact with the heated member and provide a durable uniform, integral coating.

An object of the present invention is to provide a new and improved apparatus for the uniform coating with polymeric materials.

Another object is to provide an apparatus for coating from a fluidized polymeric powder bed which is simple, inexpensive and reliable, and which results in a uniform coating having good adhesion and which is applicable to fluorinated polyethylenes.

Still another object is to provide a coating apparatus suitable for coating in cavities and interlaminar spaces, thus being a sound coating and relatively free of voids, pinholes and other similar defects.

Other objects and many of the attendant advantages of this invention will be readily appreciated as the same becomes better understood by reference to the following detailed description when considered in connection with the accompanying drawings.

BRIEF DESCRIPTION OF PREFERRED EMBODIMENTS

Figure 1:
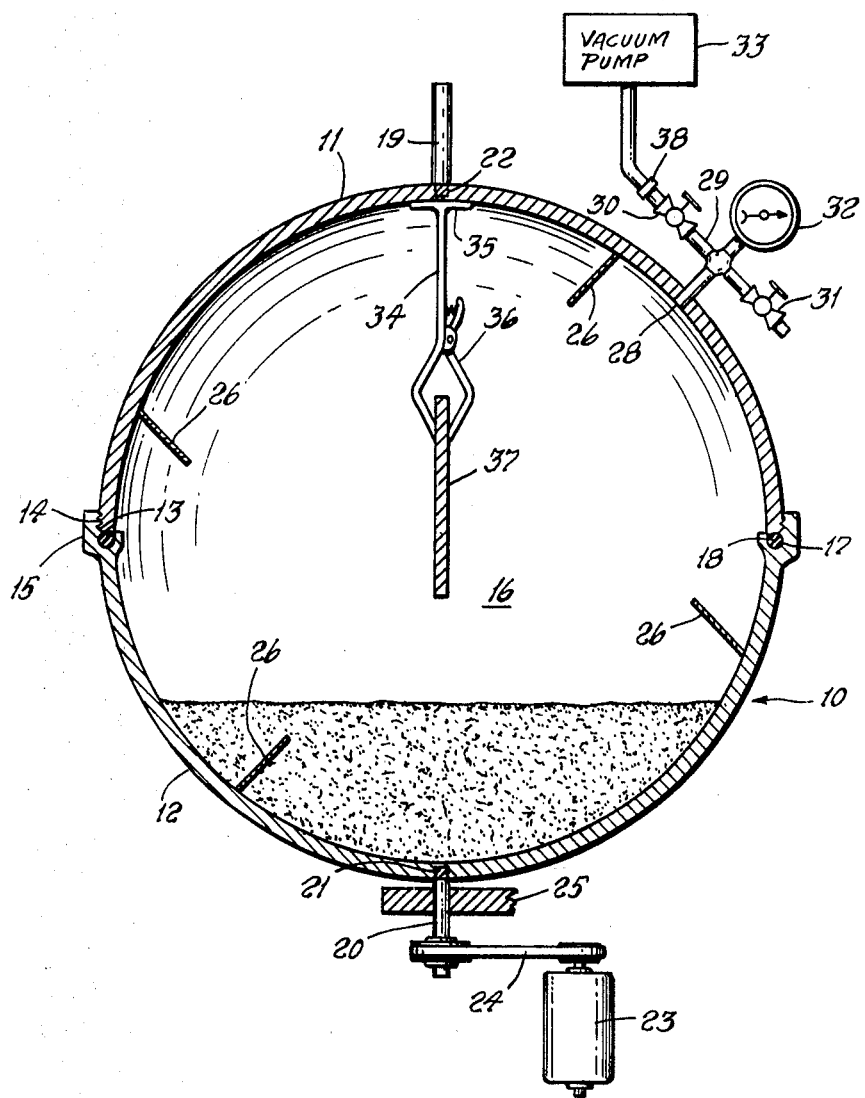
FIG. 1 is a sectional view of an embodiment made in accordance with the principle of this invention.

In the illustrated embodiment of FIG. 1, a spherical chamber 10 consists of a pair of separable hollow hemispheres 11 and 12 which are joined together by mating threads 13 and 14 provided on the outer surface of the hemisphere 11 and the inner surface of the peripheral extension 15 and thereby define a vacuum plenum 16. A recess 17 is provided between the opposed faces of the hemispheres in which an O-ring 18 is disposed so as to furnish a positive seal when the hemispheres are threaded together. Stems 19 and 20 are affixed, on opposite sides of the chamber, by threading into apertures 21 and 22 in the chamber walls. These stems are employed as pivots for rotation of the chamber thereabout as by being coupled to a motor drive 23 via a belt 24 and are supported in a bearing formed by support 25.

The interior walls of the chamber are provided with a plurality of angular, inwardly extending vanes or deflectors 26 with a "pool" 27 of polymeric coating powder at the bottom of the chamber. A typical coating powder, which is a chlorinated polyether, is sold under the trade name Penton and is manufactured by Polymer Corporation of America of Reading, Pa. There are presently available a multitude of coating powders for fluid-bed apparatus which are well known in the field. In addition it has been found that fluorinated polyethylenes can be employed and provide excellent results.

A single opening 28 in the chamber wall serves as an access therein whereby the plenum may be readily evacuated. For this purpose the piping 29, which is affixed to the chamber, is coupled to a pair of T-connected valves 30 and 31 and directly to a vacuum gauge 32. One of the valves 30 is coupled to a vacuum pump 33 while the opposite valve 31 is employed to break the vacuum and provide additional safety or flexibility. A mounting bracket 34 is supported from the inner upper central portion of the chamber wall as at 35 and carries at its free end an adjustable clamp 36. In use the chamber is separated, the powder is placed in the lower hemisphere 12 and the member or workpiece 37 to be coated is heated and then placed or secured to the clamp 36. The hemispheres are then joined, the plenum evacuated, the hose connection to the pump disconnected via a quick-disconnect connector 38, the valve closed and finally the chamber is rotated. This rotary motion forces the powder to be directed outwardly along the chamber walls and to be subsequently deflected inwardly toward the workpiece by the vanes 26. The powder striking the heated surface of the workpiece melts, fuses, and adheres thereto to form a uniform coating.

Figure 2:
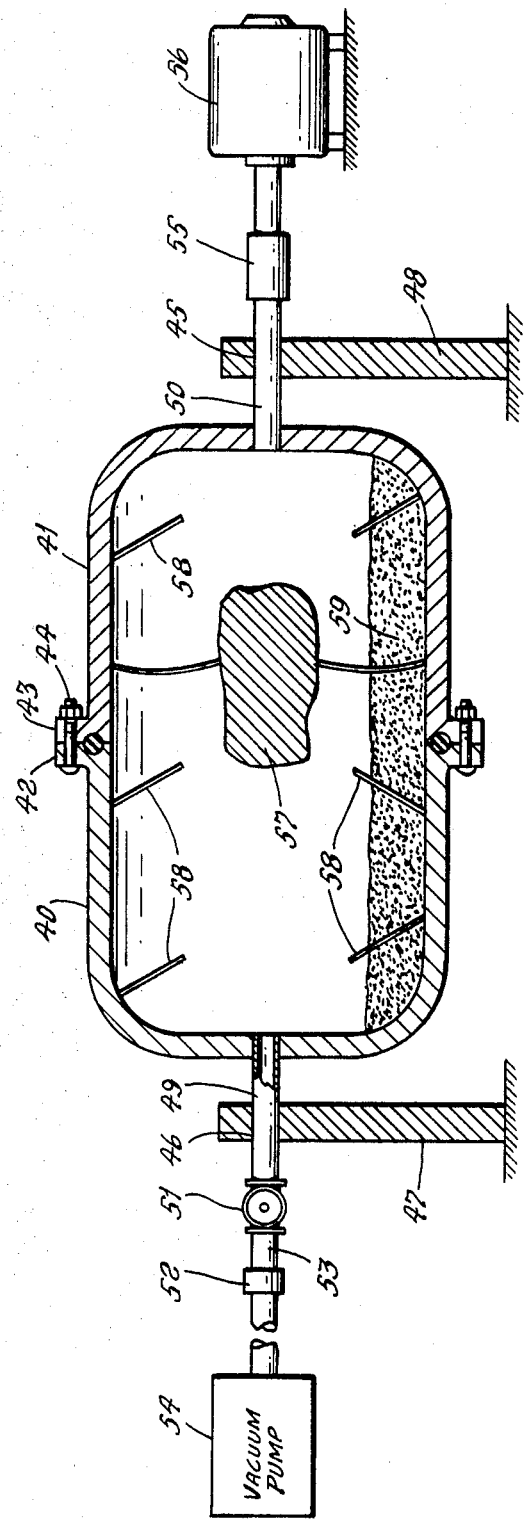
FIG. 2 is a sectional view of another embodiment made in accordance with the instant invention; and, FIG. 3 is a sectional view of an embodiment wherein the container is stationary.

The embodiment of FIG. 2 is basically similar to that of FIG. 1 except that the rotation is about a horizontal axis. The chamber parts 40 and 41 are bolted together through opposed flanges 42 and 43 via bolts 44 with an O-ring therebetween for sealing. The chamber is supported for rotation in the bearings 45, 46 of mountings 47, 48 by rod extensions 49 and 50 which pass through their respective bearings. One of the rods 49 is hollow and extends into the chamber for communication therewith with its opposite end terminating at valve 51. The other end of the valve is connected to quick-disconnected coupling 52 via pipe 53 and thereafter to a vacuum pump 54. The other rod 50 terminates at a flexible coupling 55 through which motor 56 supplies rotary energy to the chamber.

The workpiece 57 is vertically supported in one of the chamber sections 41 while the vanes 58 are disposed along the upper and lower inner walls of the chamber. Initially, the preheated workpiece is placed in the chamber with the coating powder 59 and the chamber halves sealed together. The chamber is then evacuated by the pump 54 and valve 51 closed. By disconnecting the connector 52, the system is free to rotate and the motor is operated to rotate the chamber with the workpiece being coated as hereinbefore described.

Figure 3:
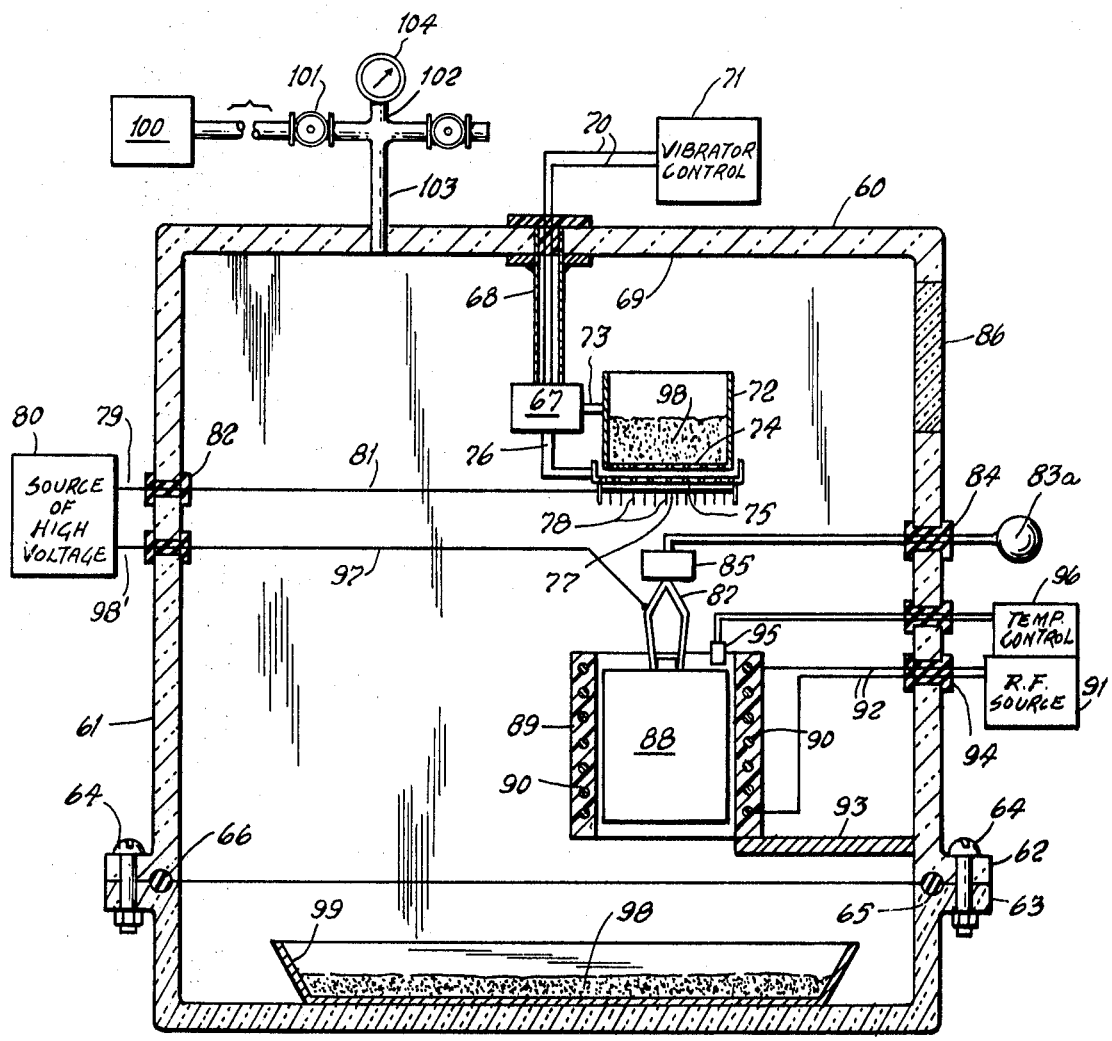

A somewhat more comprehensive structure is illustrated in FIG. 3, wherein the chamber portions 60, 61 which may be of glass or a nonmagnetic material, are bolted together along abutting flanges 62, 63 by a circumferential series of bolts 64. An annular groove 65 is provided between the abutting wall edges in which is disposed an elastomeric O-ring 66 to insure a positive seal. A vibrator 67 is rigidly supported within the chamber by a hollow support member 68 affixed to the upper inner wall 69 of the chamber portion 60. Electrical leads 70 connect the vibrator to a control unit 71 and are fed through the chamber wall in a standard manner while retaining the integrity thereof. The vibrator supports the powder container 72, which is of plastic, by being affixed to the moveable transducer element 73, which imparts lateral reciprocating motion to the container when the vibrator is activated. The base 74 of the powder container is perforated, and, supported immediately thereunder is a second or complimentary perforated plastic plate 75 which is supported in a fixed or a stationary position by support arm 76, which is of an electrically insulating material. Also supported from the arm 76 is a metallic screen 77 whose alternate strands have been cut and bent downwardly to form sharp extensions 78. The screen 77 is electrically connected to one terminal 79 of a source of high potential 80 via flexible cable 81 and passes through the chamber wall at feed-thru 82.

Manipulator arm 83 pierces the opposite chamber wall by way of mechanical feed-thru 84 and terminates at electrical insulator 85. The arm 83 should preferably be coated or covered with an insulator so as to minimize the possibility of accidental electrical shorting and terminates at handle 83a. The upper chamber wall is provided with a glass or quartz window 86 in order to permit observation during manipulation as by the handle 83a and thereafter. Clamp 87 depends from insulator 85 and supports the ferromagnetic workpiece 88 therebelow. Disposed about the workpiece is a coil form 89 which supports an induction coil 90, whose ends are connected to an external source of R.F. energy 91 via wires 92. The coil form is affixed to the chamber wall by extension 93 while the wires 92 pass through the wall at feed-thru 94. A thermocouple 95 proximate the workpiece senses the temperature thereof and, in conjunction with temperature controller 96, regulates the current output of the R.F. source 91 to maintain the proper temperature of the workpiece for the coating powder being employed. Wire or cable 97 connects the other terminal 98' of the high voltage source 80 to the workpiece via the clamp 87 so that a high potential gradient is induced between the screen 77 (and the powder 98 as it passes through the screen) and the workpiece. This gradient impels the powder toward the workpiece and retains it thereagainst. The powder which does not adhere to the workpiece falls toward the base of the chamber and is collected in the tray 99 for reuse.

The chamber is evacuated by vacuum pump 100 through valve 101 and the T-connection 102, one of whose arms 103 pierces the chamber wall. Vacuum gauge 104 indicates the pressure within the chamber for adjustment thereof.

It should be noted that the coating powder can be pretreated with an available additive to facilitate electrostatic charging or a powder having this inherent characteristic can be selected. High temperature polymers such as tetrafluoroethylines, trifluorochloroethylene, chlorinated polymers, silicone modified epoxies and polyesters using high temperature hardeners or catalysts are suitable coating powders since they are not seriously degraded, distilled or sublimed by high temperatures in a vacuum.

Initially the chamber portions are separated, the workpiece properly positioned and the coating powder placed into the container 75. As is the case for all the above-described apparatus, the workpiece is sandblasted or precleaned before being processed. The chamber is then sealed and the workpiece inductively heated to the proper temperature dependent on the type of resin, size, mass and shape of the fluidized coating powder. After heating the chamber is evacuated and the vibrator activated at the same time the high voltage is applied. The action of the vibrator shakes the container so that passageways are provided between the perforations of the base 74 and those of the plate 75, since at the vibrator rest position these perforations are misaligned and the powder cannot escape. The powder, as it falls through the screen 77, is electrostatically charged. This charging is appreciably enhanced by the sharp extensions 78. The powder under the action of gravity and the previously mentioned potential gradient causes the powder to adhere to the surface of the workpiece and fused thereon to completely and uniformly coat the exposed surface thereof. By observing the workpiece through the window 86 the process can be terminated when the article has been adequately coated.

It should be understood, of course, that the foregoing disclosure relates to only preferred embodiments of the invention and that numerous modifications or alterations may be made therein without departing from the spirit and the scope of the invention as set forth in the appended claims.

We claim:

1. A coating apparatus for applying a coating to a ferromagnetic workpiece which comprises:
   a pair of separable portions defining a sealed plenum chamber therebetween and having and supported therein:
   a container having a perforated base through which a powder in said container passes;
   a vibratory means coupled to said container for selectively vibrating the same;
   means supporting said workpiece directly below said container;
   an induction coil disposed about said workpiece;
   means for selectively evacuating said chamber;
   a source of high voltage;
   electrical means for applying said high voltage between a powder in said container and said workpiece;
   a source of R.F. energy connected to said induction coil; and
   whereby when said chamber is evacuated and said container vibrated the powder therein will be directed toward said workpiece which has been inductively heated, and will adhere and fuse thereto to provide a uniform coating thereof.

2. The apparatus according to claim 1 further including a perforated plate fixedly supported proximate and below said base.

3. The apparatus according to claim 2 further including a metallic screen fixedly supported below said plate and having a plurality of depending sharp extensions, said screen being electrically connected to said high voltage.

4. The apparatus according to claim 3 further including:
   a temperature sensor disposed to sense the temperature of said workpiece; and
   a temperature controller connected to said sensor and said R.F. source for selectively controlling the temperature of said workpiece.

5. The apparatus according to claim 4 wherein said means supporting said workpiece includes an electrically insulated manipulator arm extending through and out of said chamber and terminating in an operating handle.